US010114435B2

(12) United States Patent
Gendler

(10) Patent No.: US 10,114,435 B2
(45) Date of Patent: Oct. 30, 2018

(54) METHOD AND APPARATUS TO CONTROL CURRENT TRANSIENTS IN A PROCESSOR

(71) Applicant: Intel Corporation, Santa Clara, CA (US)

(72) Inventor: Alexander Gendler, Kiriat Motzkin (IL)

(73) Assignee: Intel Corporation, Santa Clara, CA (US)

( * ) Notice: Subject to any disclaimer, the term of this patent is extended or adjusted under 35 U.S.C. 154(b) by 1007 days.

(21) Appl. No.: 14/138,558

(22) Filed: Dec. 23, 2013

(65) Prior Publication Data

US 2015/0177799 A1 Jun. 25, 2015

(51) Int. Cl.
*G06F 1/00* (2006.01)
*G06F 1/26* (2006.01)
*G06F 1/32* (2006.01)

(52) U.S. Cl.
CPC .............. *G06F 1/26* (2013.01); *G06F 1/324* (2013.01); *G06F 1/3206* (2013.01); *G06F 1/3296* (2013.01); *Y02D 10/126* (2018.01); *Y02D 10/172* (2018.01)

(58) Field of Classification Search
None
See application file for complete search history.

(56) References Cited

U.S. PATENT DOCUMENTS

| 7,627,735 | B2 | 12/2009 | Espasa et al. |
| 7,984,273 | B2 | 7/2011 | Sprangle et al. |
| 2007/0266206 | A1 | 11/2007 | Kim et al. |
| 2008/0022049 | A1 | 1/2008 | Hughes et al. |
| 2009/0171994 | A1 | 7/2009 | Sprangle et al. |
| 2010/0268974 | A1* | 10/2010 | Floyd .................. G06F 1/3203 713/340 |
| 2011/0178652 | A1* | 7/2011 | Carter .................. G06F 1/3203 700/296 |
| 2011/0252255 | A1* | 10/2011 | Safford ................ G06F 1/3203 713/320 |
| 2012/0254591 | A1 | 10/2012 | Hughes et al. |
| 2012/0254595 | A1* | 10/2012 | Wu ....................... G06F 1/3203 712/208 |

(Continued)

FOREIGN PATENT DOCUMENTS

| EP | 2515200 | 10/2012 |
| WO | 20130101189 | 7/2013 |

OTHER PUBLICATIONS

European Patent Office, Examination Report dated May 24, 2016 in European Patent Application No. 14191972.0.

(Continued)

*Primary Examiner* — Nitin Patel
(74) *Attorney, Agent, or Firm* — Trop, Pruner & Hu, P.C.

(57) ABSTRACT

In an embodiment, a processor includes a first core that includes an execution unit, counter logic, and control logic. The counter logic is to determine a first sum of power weights of a first plurality of instructions to be executed by the execution unit in a first time period, where each power weight is assigned to a corresponding instruction and each power weight is determined independent of an instruction width of the corresponding instruction. The control logic is to request a first current protection license based on the first sum of power weights. Other embodiments are described and claimed.

15 Claims, 10 Drawing Sheets

(56) References Cited

U.S. PATENT DOCUMENTS

2012/0260117 A1* 10/2012 Acar .................. G06F 1/3243
  713/340
2013/0275787 A1   10/2013 Safford et al.
2015/0033045 A1*  1/2015 Raghuvanshi ........ G06F 1/3234
  713/320

OTHER PUBLICATIONS

European Patent Office, Extended European Search Report dated May 11, 2015, in European Patent Application No. 14191972.0.

* cited by examiner

METHOD AND APPARATUS TO CONTROL CURRENT TRANSIENTS IN A PROCESSOR

TECHNICAL FIELD

The technical field is power management of a processor.

BACKGROUND

As integrated circuit device scaling continues, current levels consumed by a device such as a processor continue to increase due to a number of factors including an increase in the number of transistors per unit area on a die, introduction of new performance features, an increase in the number of cores in a processor, and reduction in supply voltage while the power envelope remains constant.

Among the deleterious impacts of increased current are a need to design a higher power voltage regulator and system power supply, a need for higher voltage to compensate for IR droop, and a need for better voltage regulators to supply higher current with faster feedback mechanisms.

Maximum current consumption of a device is related to highest demand workload that a device can execute at any given time, and may be associated with a "power virus." The term power virus may refer to a tuned computer program with executable code that causes a high power dissipation of a core. Without a protection mechanism, this high current consumption can impact chip, package, and system power delivery design.

DETAILED DESCRIPTION

Figure 1:
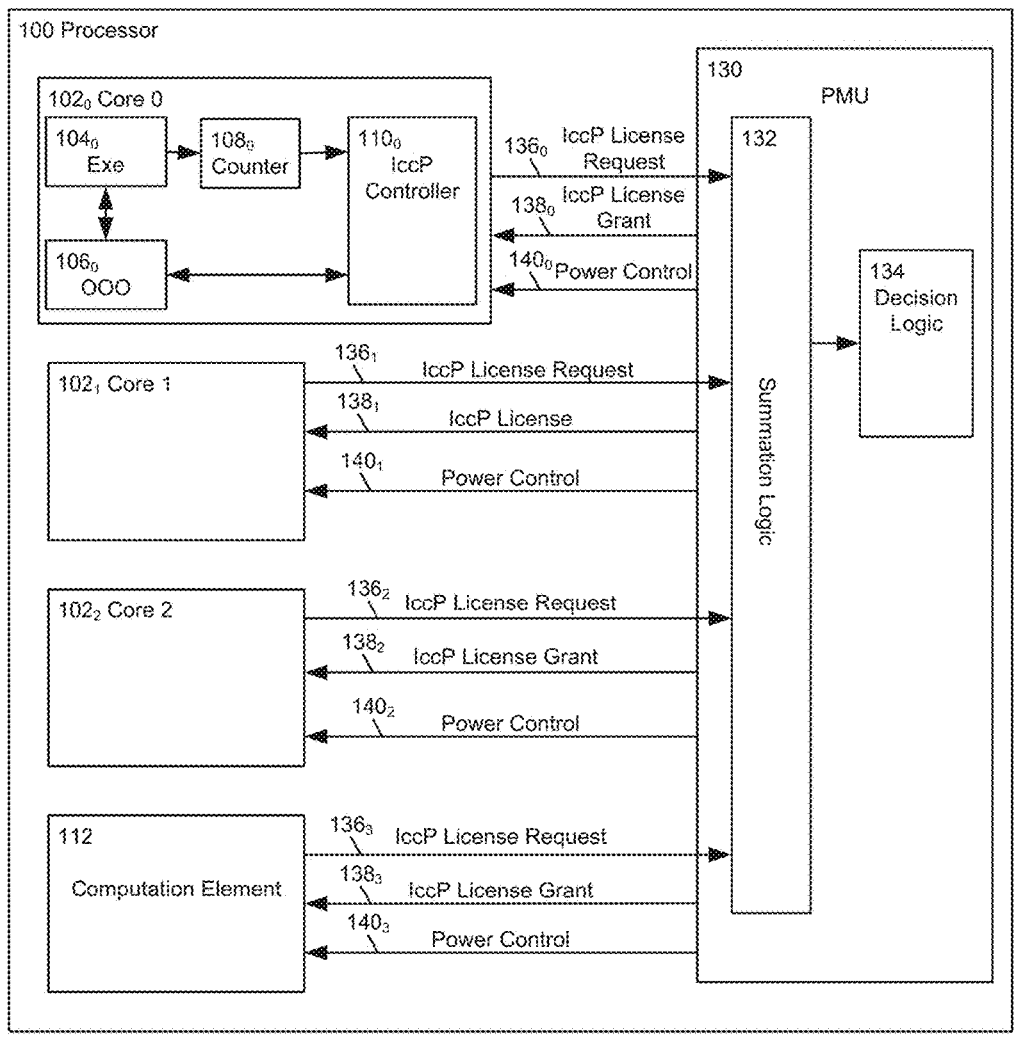
FIG. 1 is a block diagram of a processor, according to an embodiment of the present invention.

Modern processor architectures can implement functional blocks, such as vector units or accelerator hardware that can increase a dynamic range of the power/current and carry higher power demands by execution of current "power viruses," e.g., applications that place large current demands on the processor due to high processing demands. Increased power virus current can have severe consequences such as the following examples:

1) A need for higher voltage to compensate for I*R droop, which can result in:
   A) a waste of power as guard band voltage increases to provide the higher voltage. Guard band voltage, as used herein, refers to a voltage at which a processor or portion thereof is configured to operate, and is typically higher than a minimum operating voltage specified for the processor.
   B) Decreased reliability. The need for higher voltage to compensate for the I*R droop can significantly shorten lifetime of the processor.
2) Lower turbo frequency. Turbo frequency refers to a highest operation point, when a core operates at a frequency above a maximum guaranteed frequency, and is related to the maximum current needed for a power virus.
3) Package and power delivery cost. Additional capacitors and better voltage regulators (VRs) are needed to supply the higher current, thus increasing package and power delivery costs.
4) Increased system power delivery needs from battery or power supply unit.

There are several types of high power operations (including e.g., vector operations) that can cause a significant increase both in thermal design power of a processor and in "power virus" power scenarios. Among such high power operations are Advanced Vector Execution (AVX) vector operations in accordance with a given Instruction Set Architecture (ISA), such as an Intel® ISA or an ISA of another processor designer. For example, execution of AVX3 vector operations can result in a power demand that can be more than twice the thermal power design of the processor.

An additional challenge stemming from power viruses is a large swing in current (e.g., dynamic range). A challenge in voltage regulator (VR) design is accommodation of a large dynamic range. Because a fast increase current causes a drop in voltage, one technique to accommodate a larger dynamic range is to increase the guard band voltage.

Through prediction of a smaller power range of a processor and budgeting power to accommodate the predicted power range, use of large guard band voltages can be reduced due to a smaller dynamic range. To reduce guard band voltage, enforcement of separation of different power levels may need to be accomplished quickly enough, e.g., in a same order of time, as the dynamic range swings.

In one embodiment according to the present invention, a power level license request may be determined based on a sum of power weights, each power weight associated with a corresponding instruction and each power weight determined prior to execution of the instruction. A listing of instructions and their corresponding power weights may be accessible to a counter. The power weights may be established, e.g., through experiment prior to placement of a processor into operation, and each power weight may have a value that is independent of a width of the corresponding instruction. A counter may access the power weights for each of a first group of instructions to be executed in a first time period and may determine a sum of power weights associated with a power needed to execute the group of instructions during the first time period. The power level to be requested may be based on the sum of power weights of the instructions to be executed during the first time period.

By receiving instruction information obtained at a decode stage (e.g., from out-of-order logic (OOO)), rather than at an execution stage, quick changes in power levels may be accomplished. Separation of the power levels may be implemented by granting "licenses" to cores of a processor based on their predicted maximal current draw for the impending work load. In an embodiment, the licenses are labeled $IccP_0$, $IccP_1$, $IccP_2$, $IccP_3$, etc., where each license corresponds to a workload with a corresponding predicted maximum current value: $Icc_0 < Icc_1 < Icc_2 < Icc_3$. In an embodiment, each core (or other computational element e.g., graphics processing unit) can ask for a different license for each workload, e.g., each set of instructions to be executed. The license request can reflect the expected maximum current draw.

Referring to FIG. 1, shown is a block diagram of a processor 100, according to an embodiment of the present invention. The processor 100 may include a plurality of cores $102_0, \ldots, 102_n$, and optionally at least one other computation element 112, e.g., a graphics engine. As shown in core $102_0$ each core $102_i$ (i=1, n) may include an execution unit $104_i$, an out-of-order (OOO) logic unit $106_i$, counter logic $108_i$, and a current protection (IccP) controller $110_i$. For example, core $102_0$ includes execution unit $104_0$, OOO logic unit $106_0$, counter logic $108_0$, and IccP controller $110_0$. The processor 100 also includes a Power Management Unit (PMU) 130 that can include summation logic 132 and decision logic 134.

In operation, each of the cores $102_0, \ldots, 102_n$ and the computation element 112 may issue a respective IccP license request $136_0, \ldots, 136_n$. Each license request may be determined by a respective IccP controller $110_i$ of the core $102_i$ (e.g., IccP controller $110_0$ of core $102_0$) and the license request may be based on, e.g., a sum of power weights of a group of instructions to be executed during a designated time period by the respective execution unit $104_i$ (e.g., execution unit $104_0$ of core $102_0$). The sum of power weights may be determined by the counter logic $108_i$. For example, a size of the license request, e.g., magnitude of a maximum current (Icc) available to the core $102_i$ to execute the group of instructions in an execution queue to be executed in a first time period may be determined based on the sum of power weights of the group of instructions.

Each of the cores may ask the PMU 130 for a different license associated with a different level of Icc. The PMU 130 may consider the license requests of the different cores and may determine actions according to the license requests. The actions may include, e.g., changing core frequency according to the license, increasing guard band voltage, or another mechanism that limits the power provided to the core. The PMU 130 may decide, according to the license requested by the core, whether to raise guard band voltage, lose some performance (e.g., reduce core frequency), or another action, or a combination thereof. The PMU 130 may then issue to each core/computation element ($102_0$-$102_n$, 112) its respective license $138_0, 138_1, \ldots 138_n$ (in FIG. 1, $138_0$-$138_3$) that is associated with the maximum expected current draw (Icc) of the core/computation element.

For example, Out-Of-Order (OOO) logic $106_0$ can identify instructions in a first group that are in the execution queue to be executed during a first time period by the execution unit $104_0$ of the core $102_0$. The OOO logic $106_0$ can provide to the counter logic $108_0$ an indication of the instructions in the first group (e.g., an identification list). The counter logic $108_0$ may determine, (e.g., via a look-up table or other data storage, which in one embodiment may be provided by the execution logic $104_0$), a corresponding power weight for each of the instructions in the first group. Each power weight may have a respective value that is independent of corresponding instruction width. The counter logic $108_0$ can determine a sum of the power weights for the first group. The counter logic $108_0$ can provide the sum of power weights to the IccP controller $110_0$, which can determine, based on the sum of power weights, an IccP license request $136_0$ that is associated with a requested maximum current (Icc) of the core and can send the IccP license request $136_0$ to the PMU 130.

The PMU 130 may receive IccP a respective license request from each of the cores $102_0, \ldots, 102_n$ (and optionally from one or more computation elements such as computation element 112) and the PMU 130 may determine a respective license for each of the cores and/or computation elements through a combination of the summation logic 132 and the decision logic 134. For example, in one embodiment the summation logic 132 may sum the current requests of each of the IccP license requests, and the decision logic 134 may determine a respective license $138_0$-$138_n$ based on a sum of the requested Icc of the cores/computation element and total current capacity of the PMU 130. The PMU 130 may issue IccP licenses $138_0$-$138_n$ to the respective cores $102_0, \ldots, 102_n$ and may also determine power control parameters $140_0$-$140_n$ for the cores $102_0, \ldots, 102_n$. The power control parameters may include a respective core frequency and/or guard band voltage for each core/computation element. If (e.g., due to a higher than expected current demand) the issued IccP license is not sufficient to accommodate the power requirements of all instructions in the queue, the IccP controller can indicate to, e.g. a front end of one or more of the cores, that throughput is to be throttled (e.g., execution rate of instructions is to be reduced) and the respective IccP controller of the throttled core can also issue a request for an updated license having a higher Icc. In an embodiment, the throttling and the request for the license can happen before the first instruction in the queue is executed.

Figure 2:
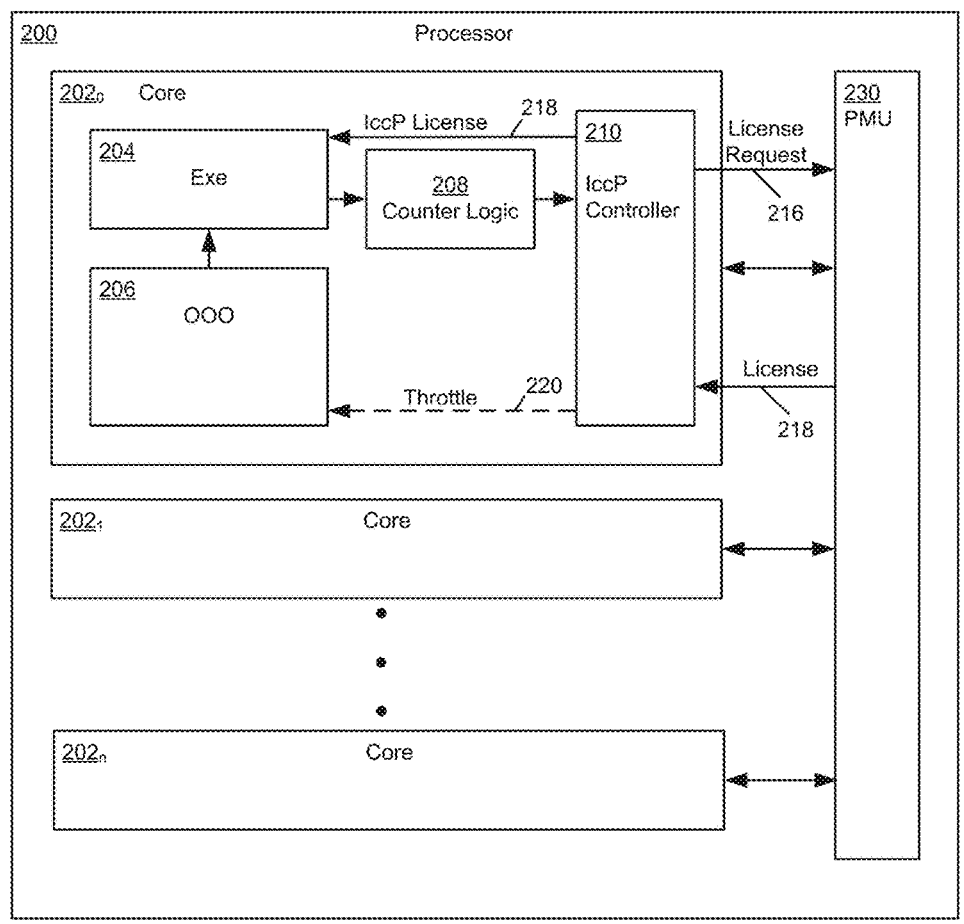
FIG. 2 is a block diagram of a processor, according to another embodiment of the present invention.

Referring to FIG. 2, shown is block diagram of a processor 200, according to another embodiment of the invention. Processor 200 includes cores $202_0, \ldots, 202_n$ and PMU 230. The core $202_0$ may include an execution unit 204, OOO logic 206, counter logic 208, and IccP controller 210. In an embodiment, each of the counter logic 208 and the IccP controller 210 may be hardware. In other embodiments, each of the counter logic 208 and the IccP controller 210 may be firmware, software, or a combination of hardware, firmware, and software.

In operation, the OOO 206 may provide to the counter logic 208 an indication of each instruction that is within a group of instructions to be executed during a first time period. The counter logic 208 may determine a sum of power weights based on stored power weight data for each of the instructions that is received from the execution unit 204. For example, the power weight of each instruction may be stored in non-volatile memory that is accessible to the execution unit 204 and is sent to the counter logic 208. In other embodiments, the power weights of each of the instructions may be directly accessible by the counter logic 208 from non-volatile memory.

The power weight data may be determined prior to operation of the processor 200, and each power weight may be assigned to the corresponding instruction and may have a value that is independent of an instruction width of the instruction. The power weight of each instruction may be associated with power consumed to execute the instruction (e.g., proportional to power consumed to execute the instruction), and may be determined by experimentation, e.g., execution of the instruction and measurement of power consumed in a pre-operational test.

Certain instructions ("special instructions") may result in an extremely small amount power during execution and may be assigned a power weight of zero. For example, a repeated string ("repstring") instruction (e.g., repeated string move, repeated string store) may be assigned the power weight of zero because execution of the repeated string instruction consumes a very small amount of power. Special instructions may include, but are not limited to, repeated string instructions.

IccP controller 210 may receive the sum of the power weights associated with the instructions in the execution queue that are to be executed during a particular time period, and the IccP controller 210 may determine an IccP license request 216 based on the sum of power weights. In an embodiment, the IccP controller 210 may compare the sum of power weights to a set of power thresholds, and may select the power threshold that is greatest without exceeding the sum of power weights. The IccP controller 210 may formulate the IccP license request 216 that specifies the selected power threshold. The IccP license request 216 may be sent to the PMU 230, which may grant a maximum current protection (IccP) license 218 based on upon consideration of the IccP license requests received from each of the cores $202_0$-$202_n$. The IccP controller 210 may pass the IccP license 218 to the execution unit 204, and if necessary to stay within a current limit associated with the license 218, the IccP controller 210 may send a request to throttle throughput via a throttle signal 220 to the OOO logic 206, which in response may throttle an instruction feed rate to the execution unit 204. The IccP controller 210 may also issue a request for an increased IccP license in response to throttling of the instruction feed rate ("instruction flow").

In an embodiment, each core includes data collection/counter logic coupled to the execution unit. For instance, counter logic 208 may be included in the core $202_0$. Power weights associated with each instruction to be executed during a determined time frame may be summed to determine a power measure. For example, a power measure may be calculated as a sum of the power weights of instructions to be executed within an evaluation window of X cycles (e.g., X is a defined number). In various embodiments, calculation of the power measure may occur in the counter logic 208 or in the IccP controller 210.

The power measure may be transmitted to the IccP controller 210, which may generate a license request based on the power measure. If the power measure reaches a particular limit, e.g., a threshold, an indication to throttle 220 a rate of instruction execution may be initiated by the IccP controller 210 and may be sent to the OOO 206. Comparison to the threshold may occur in the counter logic 208 or in the IccP controller 210.

Once the throttle 220 has initiated, a request for an updated IccP license (e.g., higher Icc value) may be sent to the PMU 230. In response, the PMU 230 may initiate a change of frequency, guard band voltage, duty cycle, a combination thereof, or another adjustment that enables the core run at lower power consumption. The PMU 230 may send to the IccP controller 210 the updated IccP license having an updated maximum expected current Icc, and the PMU 230 may also send updates of parameters such as guard band voltage, frequency and duty cycle to enable the core $202_0$ to run at or below the updated Icc without throttling instruction flow (e.g., throttling execution of instructions). The IccP controller 210 may send the IccP license 218 and the updated parameters to the execution unit 204.

Figure 3:
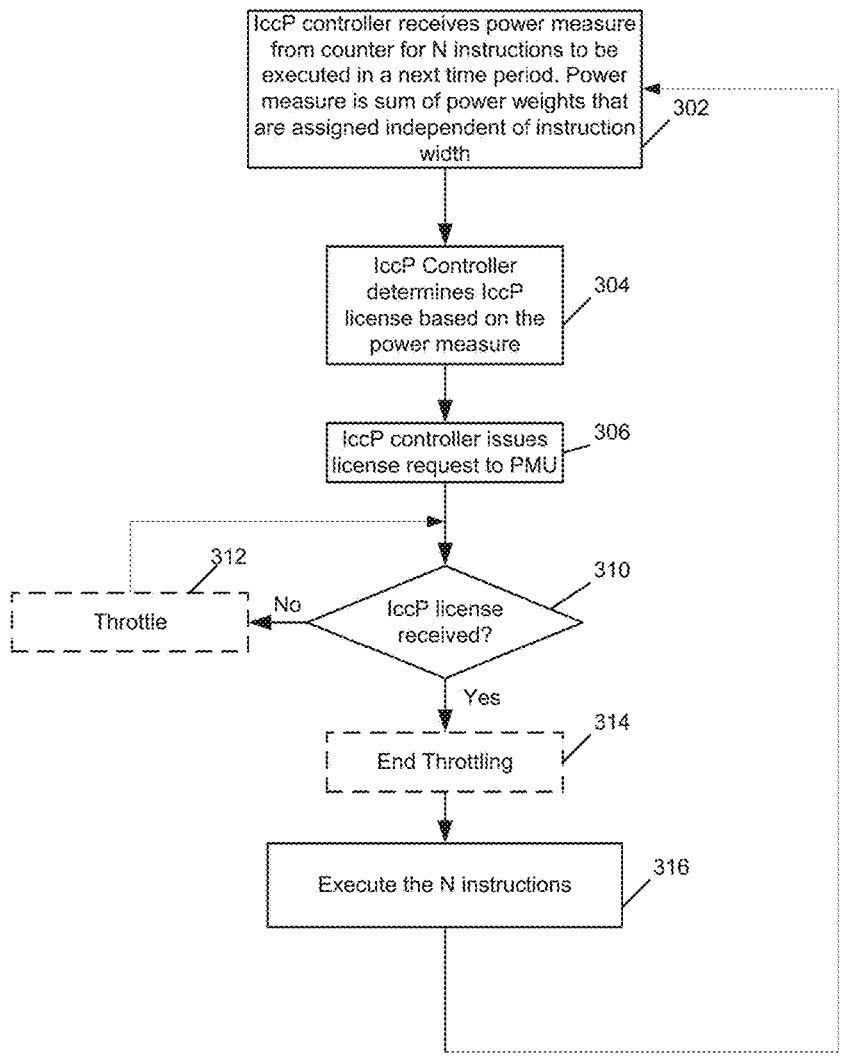
FIG. 3 is a flow chart of a method of controlling current transients, according to an embodiment of the present invention.

Turning to FIG. 3, shown is a flow chart of a method of controlling current transients in a processor according to an embodiment of the present invention. At block 302, an IccP controller of a core of a processor receives, from counter logic, a power measure associated with execution of instructions in an execution queue, prior to execution of the queue. In an embodiment, the power measure is a sum of power weights, each of which is assigned (e.g., based on experiments conducted prior to execution of any instruction of the queue) and independent of an instruction width of the corresponding instruction. Continuing to block 304, the IccP controller determines an IccP license request based on the power measure.

Proceeding to block 306, the IccP controller issues the IccP license request to a power management unit (PMU). Continuing to decision block 310, if the IccP license is not yet received by the IccP controller, at block 312 the IccP controller may optionally implement a throttling action as a temporary measure until the IccP license is received. If the IccP license is received by the IccP controller, advancing to block 314, if throttling action was implemented, the throttling action is ended. In addition to the IccP license, the IccP controller may also receive guard band voltage and core frequency information from the PMU. Proceeding to block 316, the N instructions in the queue are executed according to the IccP license received and according to other received parameters, e.g. guard band voltage and core frequency. That is, the processor can process instructions according to the received parameters, e.g., running at a frequency according to the core frequency information and at a voltage according to the guard band voltage.

Figure 4:
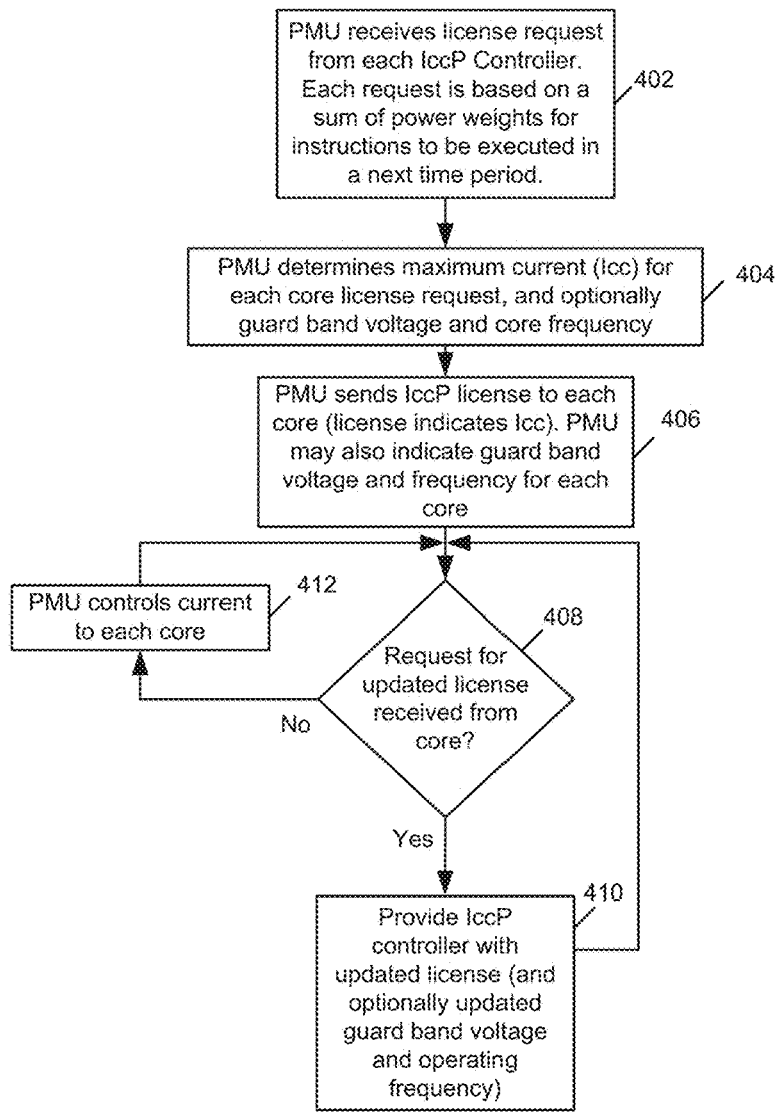
FIG. 4 is a flow chart of a method of responding to a current (Icc) license request, according to an embodiment of the present invention.

Referring now to FIG. 4, shown is a flow chart of a method of responding to a current (IccP) license request, according to an embodiment of the invention. Beginning at block 402, a power management unit (PMU) of a processor may receive a respective IccP license request from each IccP controller of one or more cores. Each IccP license request may be based on a power measure of the instruction queue of instructions to be executed during a next time period. In an embodiment, the power measure is a sum of power weights of each of the instructions in the instruction queue.

Continuing to block 404, the PMU may determine a respective maximum Icc for each core in the processor, and optionally may also determine guard band voltage and core operation frequency for each core in the processor, based upon all of the license requests and based on a power capacity of the PMU. For example, the PMU may store a power limit table that may be used to determine a guard band voltage and an operation frequency for a core based on the IccP license request received from the IccP controller of the core. Advancing to block 406, the PMU may issue an IccP license (and optionally guard band voltage and/or operating frequency) to each core.

Moving to decision diamond 408, if the PMU receives a request for an updated IccP license from a core (e.g., generated by the core IccP controller responsive to high current demand by the core due to an increase in power measure for the instruction queue to be executed in a subsequent time period), moving to block 410 the PMU may provide the IccP controller with an updated license, and optionally updated guard band voltage and frequency parameters. Back at decision diamond 408, if no request for an updated license request is received, moving to block 412 the PMU controls current to each core according to the IccP license most recently issued to the core, and returning to decision block 408, the PMU awaits a subsequent license update request.

The calculation of the new voltage/frequency operation parameters and adjustment of the voltage/frequency operating parameters may be time intensive. To ensure a minimal performance degradation due to throttling and frequency (P-State) transitions, upon receiving a license, the IccP may refrain from issuance of another request for an updated license for a relatively long time, which can reduce thrashing (e.g., rapid changes in license supplied to a core). In one embodiment, the IccP may refrain from a request to decrease Icc current for a long time period ("hysteresis") as compared with a time period between a first IccP license request for a first Icc current and a subsequent IccP license request for a higher Icc current, because grant of a higher IccP license is more likely to reduce thrashing than grant of a lower IccP license.

Thus, according to the method of FIG. 4, each core may be issued a needs-based current (Icc) usage license that can reduce dynamic range within which to execute each operation, which may result in a more efficient distribution of total power and may reduce a need to throttle instruction throughput of one or more of the cores, e.g., throttle execution of instructions.

Figure 5:
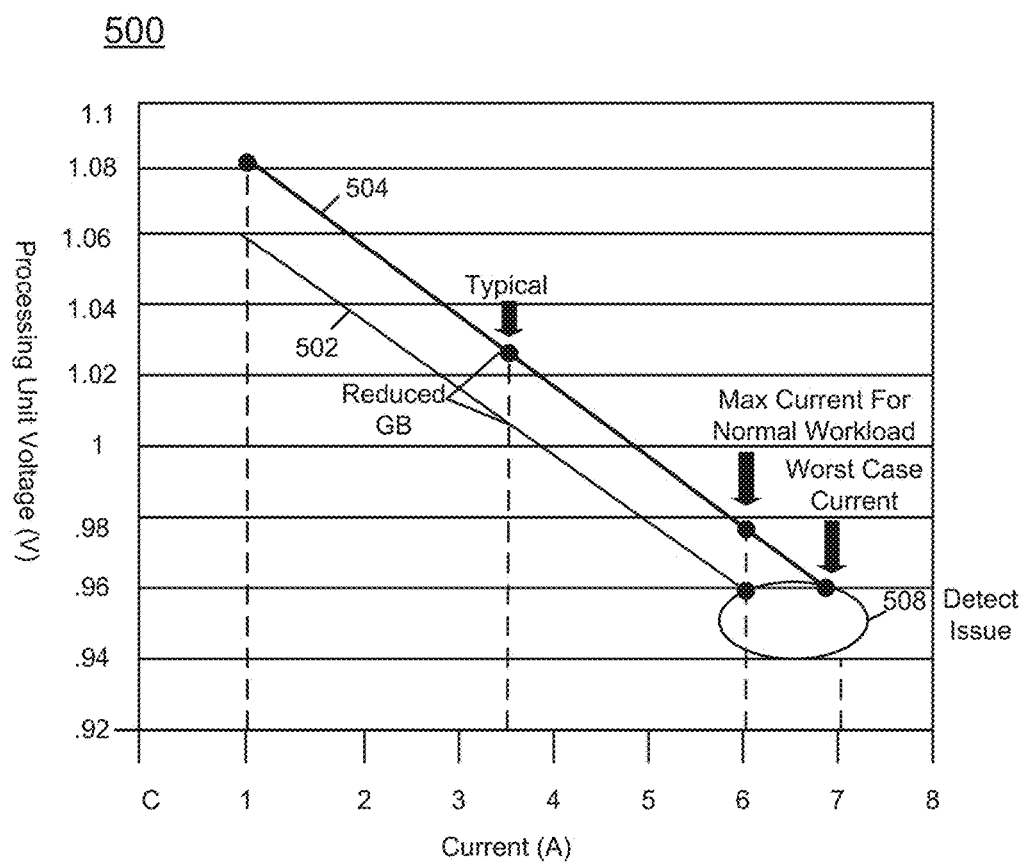
FIG. 5 is a graph of load lines associated with core operation, according to an embodiment of the present invention.

Referring to FIG. 5, shown is a graph of load lines associated with core operation, according to an embodiment of the invention. Lines 502 and 504 show expected on-die voltage for a given current. Line 504 represents a system without IccP license issuance in place and indicates a voltage supplied to a core for a range of current draw. Line 502 represents a system with IccP license issuance in place, which can reduce the guard band voltage. For example, a normal workload may have a maximum current draw of 6 amperes with a corresponding voltage delivered of 0.96 volts. If the predicted current draw, determined by power measure of the instruction queue, at line 502 exceeds 6 amperes, the IccP logic may request and receive an updated IccP license forwarded to the core along with a higher guard band voltage, e.g., load line 504. In other embodiments, there may be several load lines and the core may jump to any of the load lines permitted by an updated IccP license. Prediction of the current draw based on a power measure of instructions to be executed by an execution unit of a core enables the PMU to change the guard band voltage and avoid operation at a worst case current draw, e.g., region 508.

Reduction of the current draw can reduce $I^2R$ power losses. In the example presented in FIG. 5, an increase of power efficiency due to reduction of guard band voltage may be ~20 mV that can translate to ~4% power loss reduction.

Figure 6:
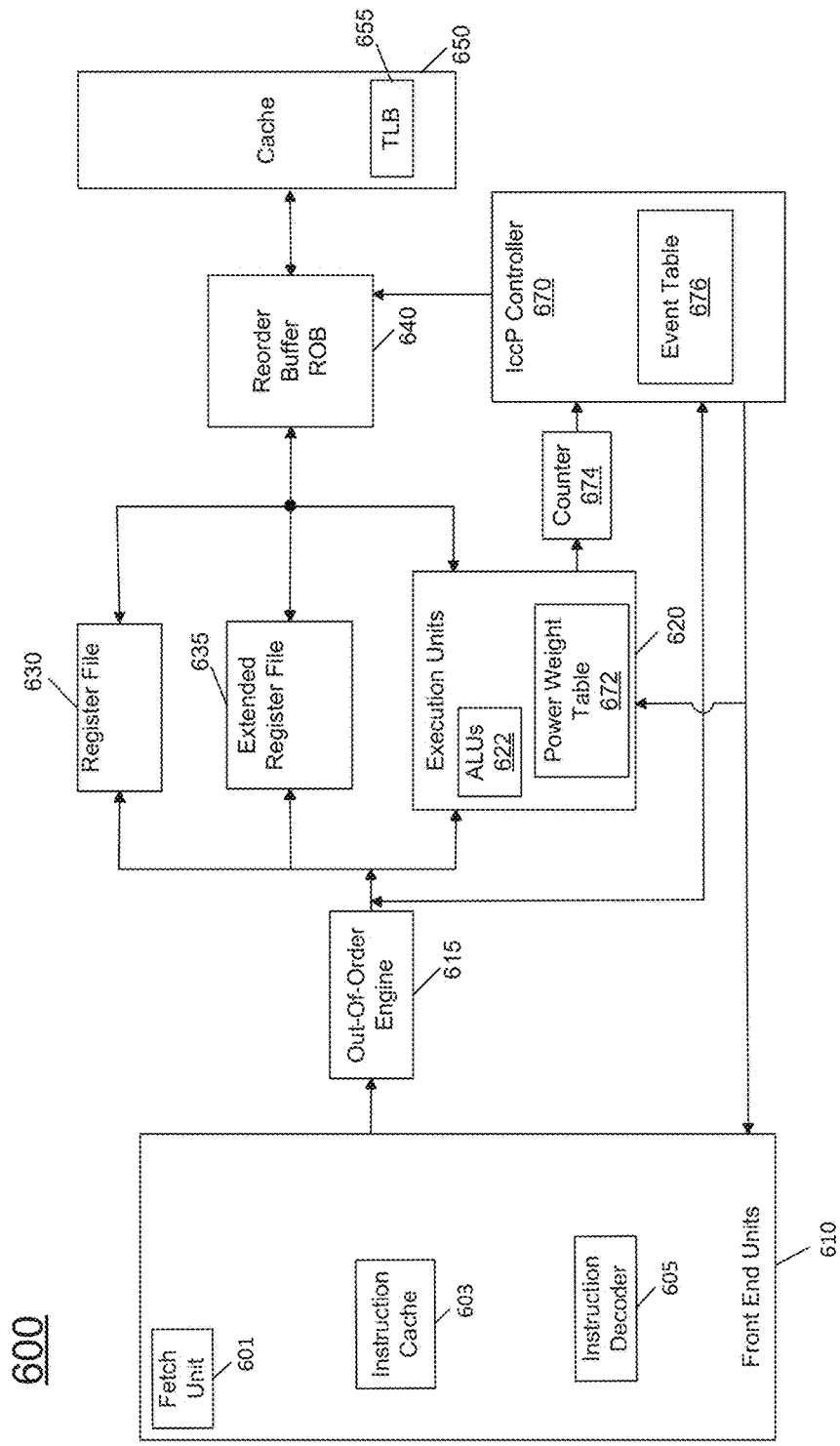
FIG. 6 is a block diagram of a processor core in accordance with one embodiment of the present invention.

Embodiments can be implemented in many different processor types. For example, embodiments can be realized in a processor such as a multicore processor. Referring now to FIG. 6, shown is a block diagram of a processor core in accordance with one embodiment of the present invention. As shown in FIG. 6, processor core 600 may be a multi-stage pipelined out-of-order processor. Processor core 600 is shown with a relatively simplified view in FIG. 6 to illustrate various features used in connection with current transient control in accordance with an embodiment of the present invention.

As shown in FIG. 6, core 600 includes front end units 610, which may be used to fetch instructions to be executed and prepare them for use later in the processor. For example, front end units 610 may include a fetch unit 601, an instruction cache 603, and an instruction decoder 605. In some implementations, front end units 610 may further include a trace cache, along with microcode storage as well as instruction storage. Fetch unit 601 may fetch macro-instructions, e.g., from memory or instruction cache 603, and feed them to instruction decoder 605 to decode them into primitives such as instructions for execution by the processor.

Coupled between front end units 610 and execution units 620 is an out-of-order (OOO) engine 615 that may be used to receive the instructions and prepare them for execution. More specifically OOO engine 615 may include various buffers to re-order instruction flow and allocate various resources needed for execution, as well as to provide renaming of logical registers onto storage locations within various register files such as register file 630 and extended register file 635. OOO engine 615 may also provide (e.g., to counter logic 674 and/or IccP controller 670) identification of instructions in an instruction queue that await execution by execution units 620, according to embodiments of the present invention. Register file 630 may include separate register files for integer and floating point operations. Extended register file 635 may provide storage for vector-sized units, e.g., 256 or 512 bits per register.

Various resources may be present in execution units 620, including, for example, various integer, floating point, and single instruction multiple data (SIMD) logic units, among other specialized hardware. For example, such execution units may include one or more arithmetic logic units (ALUs) 622.

When operations are performed on data within the execution units, results may be provided to retirement logic, namely a reorder buffer (ROB) 640. More specifically, ROB 640 may include various arrays and logic to receive information associated with instructions that are executed. This information is then examined by ROB 640 to determine whether the instructions can be validly retired and result data committed to the architectural state of the processor, or whether one or more exceptions occurred that prevent a proper retirement of the instructions. Of course, ROB 640 may handle other operations associated with retirement.

As shown in FIG. 6, ROB 640 is coupled to cache 650 which, in one embodiment may be a low level cache (e.g., an L1 cache) and which may also include translation lookaside buffer (TLB) 655, although the scope of the present invention is not limited in this regard. From cache 650, data communication may occur with higher level caches, system memory and so forth.

As further seen in FIG. 6, core 600 can include the maximum current protection (IccP) controller 670. IccP controller 670 can be configured to receive information from counter logic 674 that provides an indication of power needed to execute the instructions in the instruction queue, e.g., by providing a sum of power weights of all instructions in the instruction queue.

In some implementations, execution units 620 can include a power weight table 672 that stores a power weight of each instruction of a set of instructions. The counter 674 can determine the sum of power weights of the instructions in the instruction queue for a particular window (e.g., each window includes X cycles). The counter logic 674 can provide the power measure to the IccP controller 670. In some implementations, the IccP controller 670 may determine, e.g., via comparison with threshold values stored in an event table 676 that the power measure exceeds a given threshold, and the IccP controller 670 can send a request for an updated license to a power control unit (not shown), according to embodiments of the present invention.

As further seen in FIG. 6, the IccP controller 670 can be coupled to the various units of the processor including front end units 610, execution units 620 and ROB 640. Responsive to detection of a high power measure, the IccP controller 670 can issue a signal such as a throttle signal to at least one of these units to throttle its operation to thus reduce current consumption in a substantially instantaneous manner. Note that while the implementation of the processor of FIG. 6 is with regard to an out-of-order machine such as of a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry. Furthermore, other embodiments may be implemented in a graphics processor. For implementation in a graphics processor, the detection and control can be done based on number of active execution units, special function blocks or so forth.

Figure 7:
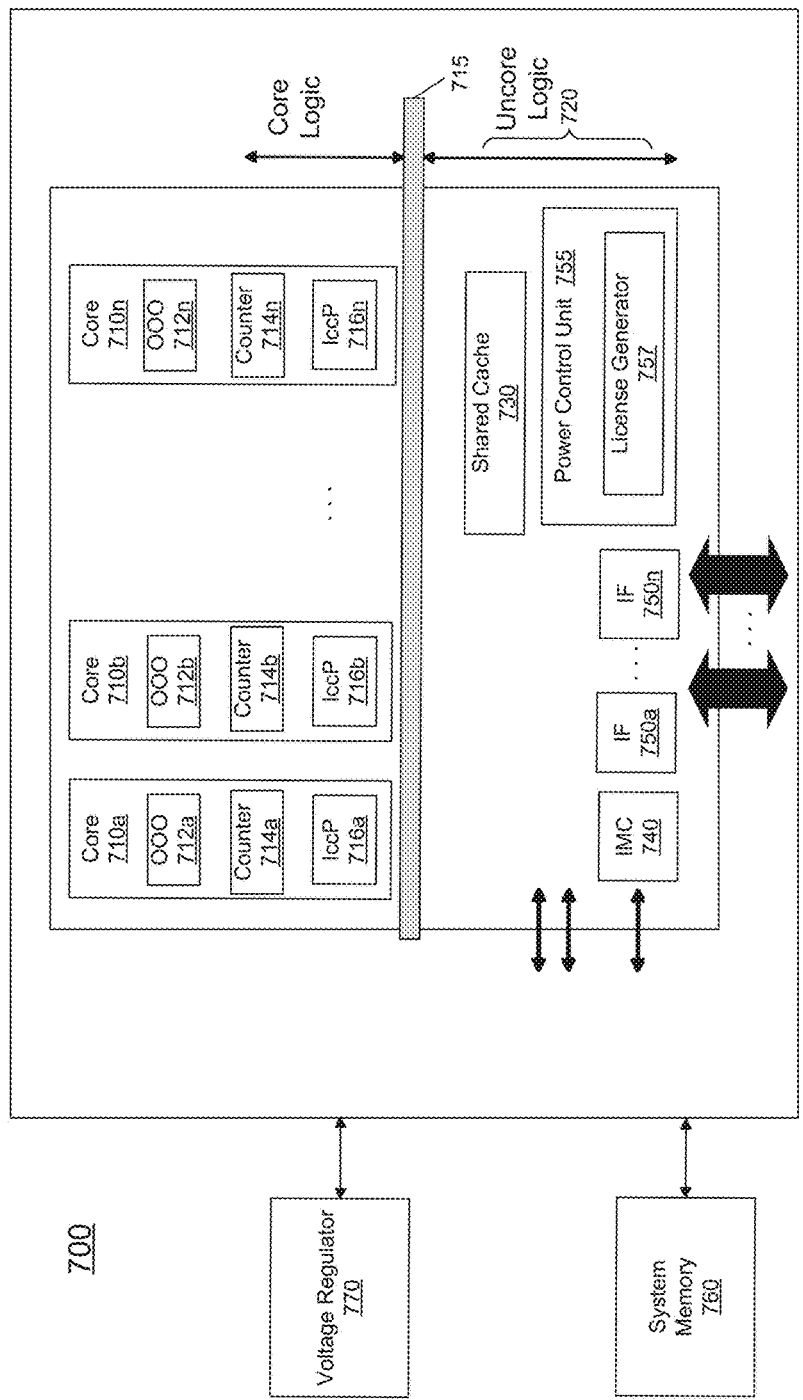
FIG. 7 is a block diagram of a processor in accordance with an embodiment of the present invention.

Referring now to FIG. 7, shown is a block diagram of a processor in accordance with an embodiment of the present invention. As shown in FIG. 7, processor 700 may be a multicore processor including a plurality of cores $710_a$-$710_n$. In one embodiment, each such core may be of an independent power domain and can be configured to operate at an independent voltage and/or frequency, and to enter turbo mode when available headroom exists. As seen, each core can include at least OOO $712_a$-$712_n$ that can provide instruction information, prior to execution of the instructions, to a counter logic $714_a$-$714_n$ that determines a sum of power weights to be provided to maximum current protection (IccP) logic $716_a$-$716_n$ in accordance with embodiments of the present invention. The various cores may be coupled via an interconnect 715 to a system agent or uncore logic 720 that includes various components. As seen, the uncore logic 720 may include a shared cache 730 which may be a last level cache. In addition, the uncore may include an integrated memory controller 740, various interfaces 750 and a power control unit 755. In the embodiment of FIG. 7, power control unit 755 can include a license generator 757. In general, license generator 757 can be configured to generate a license responsive to a license request received from one of the IccP logics $716_a$-$716_n$, according to embodiments of the present invention.

With further reference to FIG. 7, processor 700 may communicate with a system memory 760, e.g., via a memory bus. In addition, by interfaces 750, connection can be made to various off-chip components such as peripheral devices, mass storage and so forth. Also shown in FIG. 7 is a voltage regulator 770, which may be controlled, e.g., by power control unit 755, to provide a regulated operating voltage. While shown with this particular implementation in the embodiment of FIG. 7, the scope of the present invention is not limited in this regard.

Figure 8:
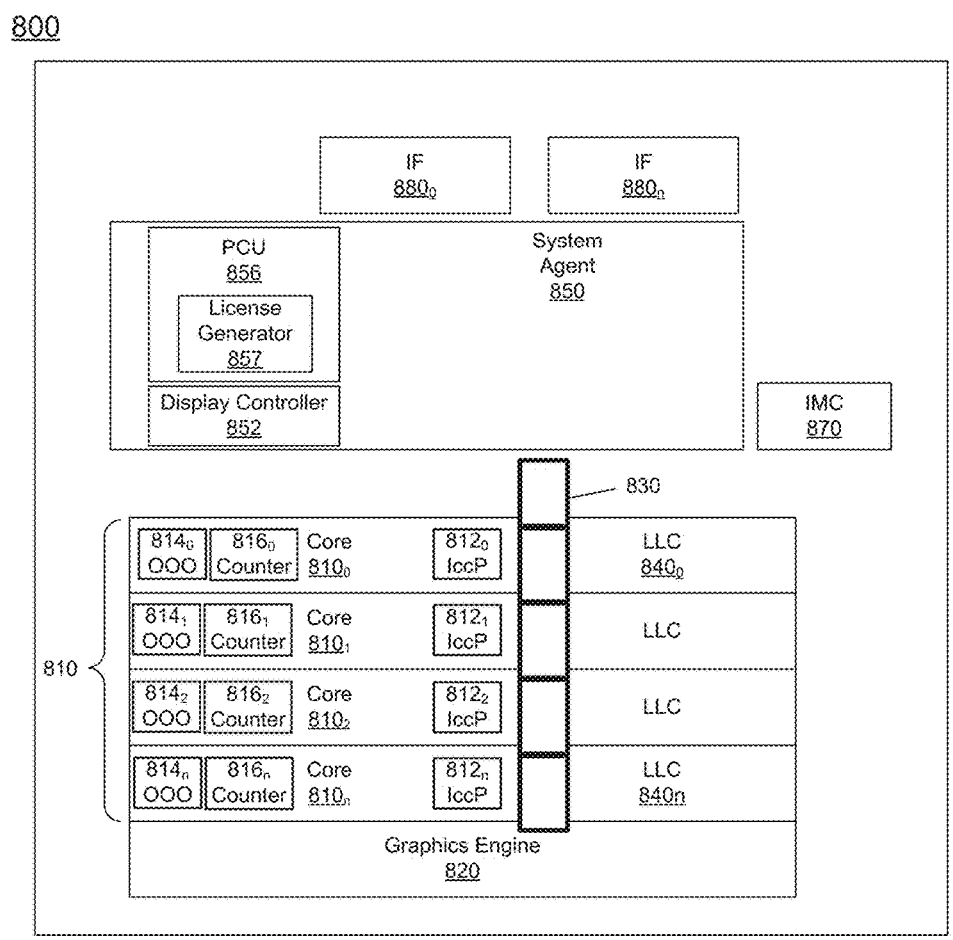
FIG. 8 is a block diagram of a multi-domain processor in accordance with another embodiment of the present invention.

Referring now to FIG. 8, shown is a block diagram of a multi-domain processor in accordance with another embodiment of the present invention. As shown in the embodiment of FIG. 8, processor 800 includes multiple domains. Specifically, a core domain 810 can include a plurality of cores $810_0$-$810_n$, a graphics domain 820 can include one or more graphics engines, and a system agent domain 850 may further be present. Each of domains 810 and 820 may operate at different voltage and/or power. Note that additional domains can be present in other embodiments. For example, multiple core domains may be present each including at least one core.

In general, each core 810 may further include low level caches in addition to various execution units and additional processing elements along with IccP logic $812_0$-$812_n$ and OOO $814_0$-$814_n$ to provide instruction information to a respective counter logic $816_0$-$816_n$ that can provide a power measure such as a sum of instruction power weights to the IccP logic $812_0$-$812_n$, in accordance with embodiments of the present invention. The IccP logic $812_0$-$812_n$ may formulate an IccP license request based on the power measure. Similar IccP logic can be implemented within the graphic engine(s) of graphics domain 820. In turn, the various cores may be coupled to each other and to a shared cache memory formed of a plurality of units of a lower level cache (LLC) $840_0$-$840_n$. In various embodiments, each LLC $840_i$ may be shared amongst the cores and the graphics engine, as well as various media processing circuitry. As seen, a ring interconnect 830 thus couples the cores together, and provides interconnection between the cores, graphics domain 820 and system agent circuitry 850.

As further seen, system agent domain 850 may include display controller 852 which may provide control of and an interface to an associated display. As further seen, system agent domain 850 may include a power control unit 856 to perform power management operations for the processor. In the embodiment of FIG. 8, the power control unit 856 can include a license generator 857 to thus provide IccP licenses to one or more of the cores, as discussed above.

As further seen in FIG. 8, processor 800 can further include an integrated memory controller (IMC) 870 that can provide for an interface to a system memory, such as a dynamic random access memory (DRAM). Multiple interfaces $880_0$-$880_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with the QPI™ protocol may also be provided. Although shown at this high level in the embodiment of FIG. 8, understand the scope of the present invention is not limited in this regard.

Figure 9:
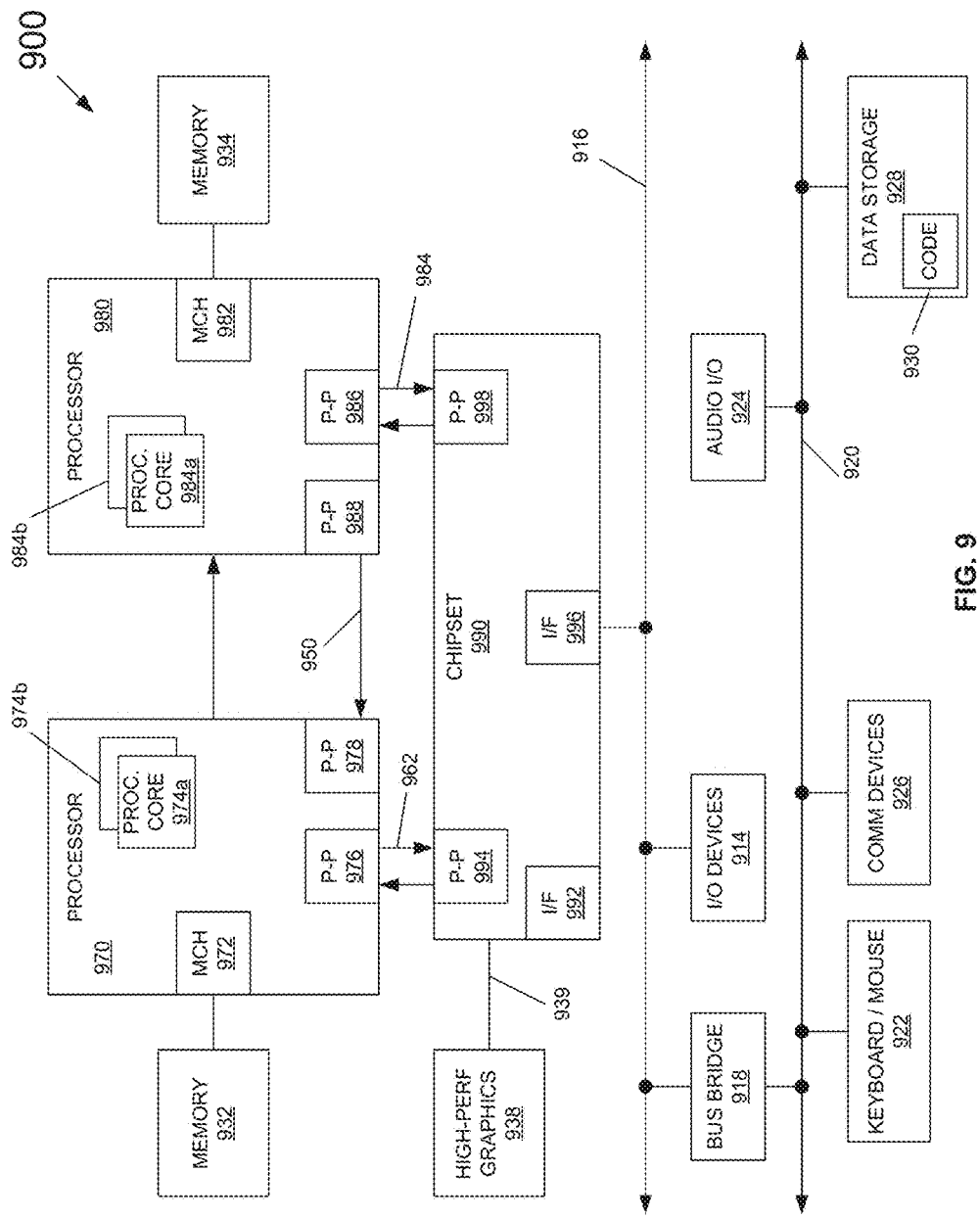
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 900 is a point-to-point interconnect system, and includes a first processor 970 and a second processor 980 coupled via a point-to-point interconnect 950. As shown in FIG. 9, each of processors 970 and 980 may be multicore processors, including first and second processor cores (i.e., processor cores 974a and 974b and processor cores 984a and 984b), although potentially many more cores may be present in the processors. Each of the processors can include current protection logic (not shown) that can determine a license request based on a sum of power weights of instructions in an instruction queue, in accordance with various embodiments of the present invention. In addition, the processors can further include a power controller (e.g., power management unit (PMU), not shown) to receive a current protection license request from one or more cores of the processor, and to grant respective current protection licenses, as described herein.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCHs 972 and 982 couple the processors to respective memories, namely a memory 932 and a memory 934, which may be portions of system memory (e.g., DRAM) locally attached to the respective processors. First processor 970 and second processor 980 may be coupled to a chipset 990 via P-P interconnects 962 and 984, respectively. As shown in FIG. 9, chipset 990 includes P-P interfaces 994 and 998.

Furthermore, chipset 990 includes an interface 992 to couple chipset 990 with a high performance graphics engine 938 via a P-P interconnect 939. In turn, chipset 990 may be coupled to a first bus 916 via an interface 996. As shown in FIG. 9, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a disk drive or other mass storage device which may include code 930, in one embodiment. Further, an audio input/output (I/O) 924 may be coupled to second bus 920. Embodiments can be incorporated into other types of systems including mobile devices such as a smart cellular telephone, tablet computer, netbook, Ultrabook™, or so forth.

Figure 10:
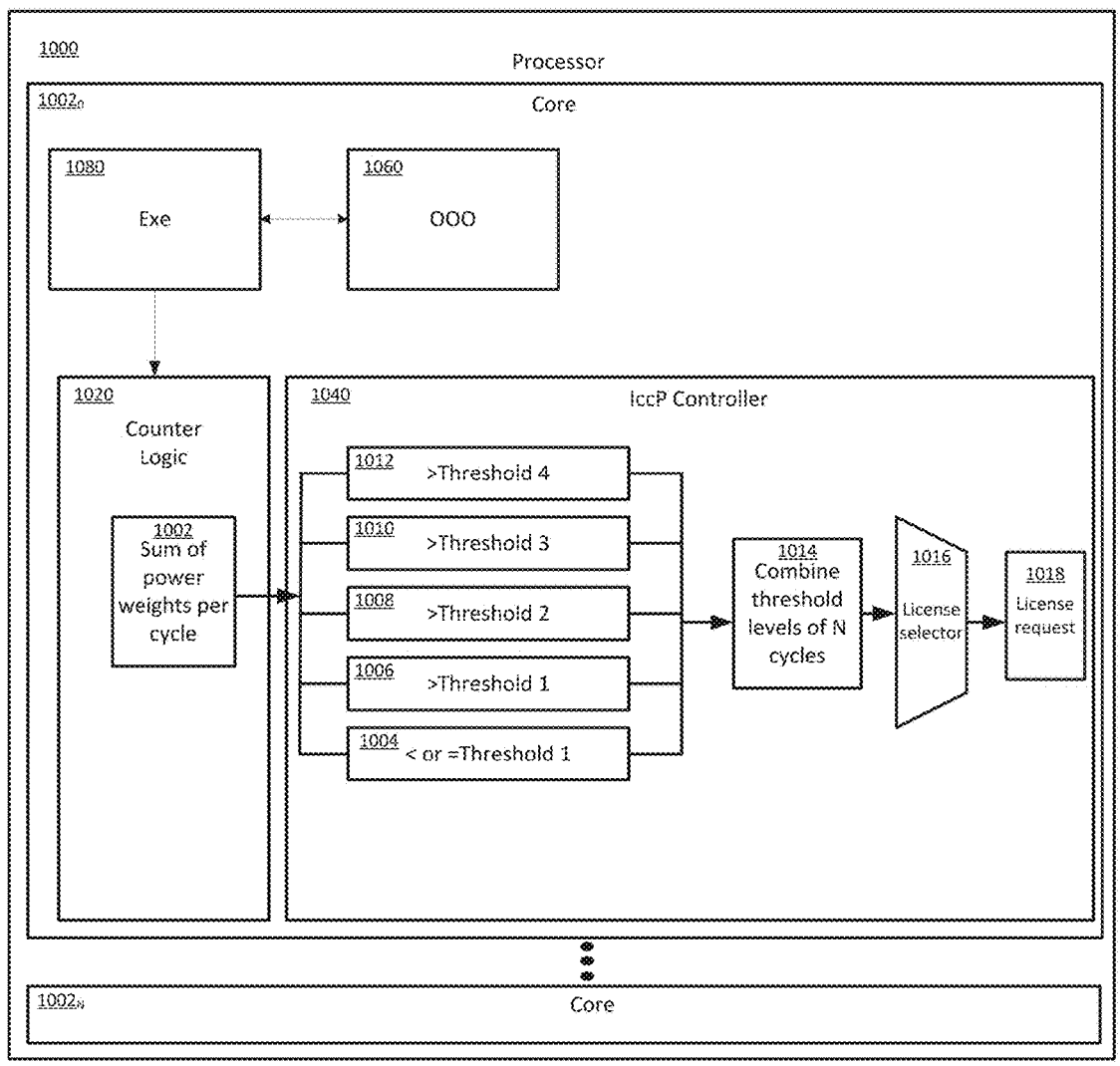
FIG. 10 is a block diagram of a portion of a processor in accordance with an embodiment of the present invention.

FIG. 10 is a block diagram of a processor, according to an embodiment of the present invention. The processor 1000 includes a plurality of cores 1002$_1$-1002$_N$. Core 1002$_1$ includes counter logic 1020, IccP controller 1040, out-of-order (OOO) logic 1060 and execution logic 1080, as well as other components (not shown). In operation, the counter logic 1020 may receive from the OOO 1060 an indication of each instruction to be executed in an execution queue for each cycle within a window of N cycles. The counter logic 1020 may determine a sum of power weights per cycle, e.g., by retrieval of a corresponding power weight associated with each instruction to be executed in the cycle, and addition of the retrieved power weights per cycle. The sum of power weights for a given cycle may be sent to the IccP controller 1040, which may categorize the sum of power weights for each cycle into one of a plurality of bins, each bin corresponding to a power range within a threshold level ("T"). As an example, five bins are shown. However, in other embodiments there may be more bins or less bins. As shown in FIG. 1000, the bins are bin 1004 (less than or equal to threshold 1), bin 1006 (>T1 and ≤T2), bin 1008 (>T2 and ≤T3), bin 1010 (>T3 and ≤T4), and bin 1012 (>T4). The sum of power weights per cycle is placed into the appropriate bin, e.g., a count associated with the appropriate bin is increased by one.

After the power weights of N cycles are summed and the sum is placed into the appropriate bin, the results are combined at logic 1014. In an embodiment, the count of sums in each bin may be multiplied by the threshold level of the bin and results may be summed to determine a power measure of the instructions in the N cycles. That is, each sum may be treated as a single count of the bin. (For example, three sums placed in a particular bin may be treated as a count of three for the particular bin, etc.) In an embodiment, it may be determined that a count of A sums are in bin 1004 (T1), a count of B sums are in bin 1006 (T2), a count of C sums are in bin 1008 (T3), a count of D sums are in bin 1010 (T4), and a count of E sums are in bin 1012 (T5), and the power measure may be calculated as:

$$\text{power measure}=(T1)(A)+(T2)(B)+(T3)(C)+(T4)(D)+(T5)(E) \quad (1)$$

The power measure may be sent to license selector logic 1016, which may determine a magnitude of current protection (IccP) license to request based on the power measure. The license selector logic 1016 may generate a corresponding license request 1018 to be sent to a power management unit (not shown).

The following examples pertain to further embodiments.

In a first example, a processor includes at least one core, and in particular includes a first core that includes an execution unit and counter logic to determine a first sum of power weights of a first plurality of instructions to be executed by the execution unit in a first time period, where each instruction is assigned a corresponding power weight that is determined independent of an instruction width of the corresponding instruction. The first core also includes control logic to request a first current protection license for the first core based on the first sum of power weights. In a particular embodiment, a repeated string instruction has a power weight of zero.

The processor may include a power management unit (PMU) to provide the first current protection license to the control logic in response to the request. The PMU may receive a request of a corresponding current protection license from each of a plurality of cores, and may grant the corresponding current protection licenses in response to the requests. The current protection licenses may be determined at least in part based on a power capacity of the PMU. The PMU may determine a respective action to be taken by each of the cores based on the licenses granted and based on the corresponding request of each of the cores. For example, the PMU may determine a first action to be taken by the first core, such as throttling execution of the first plurality of instructions responsive to a first license granted that is smaller than the first request. In another embodiment, the first action may be to change a first frequency of the first core.

Additionally, the control logic may be further configured to determine a second sum of power weights of a second plurality of instructions to be executed by the execution unit in a second time period. The second sum may be determined based on the respective power weights of each instruction of the second plurality of instructions. The control logic may generate a second request of a second current protection license whose value corresponds to the second sum of power weights.

In a second example a machine-readable medium stores instructions, which if performed by a machine cause the machine to perform a method that includes receiving, at control logic of a core of the processor, an indication of each instruction of a first plurality of instructions to be executed by the core during a first time period. The machine-readable medium also includes instructions to determine a sum of power weights of the first plurality of instructions based on a respective power weight of each of the first plurality of instructions, where each instruction is assigned a corresponding power weight that is determined independent of an instruction width of the corresponding instruction. In a particular embodiment, each of a plurality of special instructions, including a repeated string instruction, has a corresponding power weight of zero. The machine-readable medium also includes instructions to request a first current protection license from a power management unit (PMU) of the processor based on the sum of power weights.

The machine-readable medium may also include instructions to receive, by the control logic, the first current protection license responsive to the request and to execute the first plurality of instructions according to a current limit indicated by the first current protection license. The machine-readable medium may include instructions to, upon receipt of the first current protection license, receive updated parameter values that specify an updated frequency of operation of the core. The machine-readable medium may include instructions to throttle execution of the first plurality of instructions responsive to a denial of the requested first current protection license. The machine-readable medium may include instructions to repeat the request for the first current protection license responsive to the denial of the requested first current protection license and to cease to throttle the execution of the first plurality of instructions when the request is granted.

In a third example, a system includes a system memory and a processor coupled to the system memory. The processor may include a plurality of cores. A first core includes an execution unit, counter logic to determine a first sum of power weights of a first plurality of instructions to be executed by the execution unit in a first time period based on a respective power weight of each of the first plurality of instructions, where each power weight is determined independent of an instruction width of the corresponding instruction. The first core also includes control logic to generate a request of a current protection license whose value corresponds to the first sum of power weights. Optionally, the control logic is further configured to identify a first threshold that is a largest of a first set of thresholds each of which is less than or equal to the first sum of power weights, and to determine the value of the current protection license request based on the first threshold.

The system of the third example may include a power management unit (PMU) to receive a respective license request from each of the cores and to issue a respective license to each core based on the received license requests. Responsive to receipt from the respective control logic the updated license request, the PMU may issue an updated current protection license based on the updated license request, and indicate to the control logic whether to adjust at least one of a guard band voltage parameter and a core frequency of the core, based on the updated license.

The control logic of the third example may send, to out-of-order logic of the first core, an indication to throttle instruction throughput to the execution unit until the requested current protection license is received. The counter logic may determine a second sum of power weights of a second plurality of instructions to be executed by the respective execution unit in a second time period based on a respective power weight of each of the second plurality of instructions, and the control logic may generate a request of a second current protection license whose value corresponds to the second sum of power weights.

In a fourth example, a method includes receiving, at control logic of a core of a processor, an indication of each instruction of a first plurality of instructions to be executed by the core during a first time period. The method also includes determining a first sum of power weights of the first plurality of instructions based on a respective power weight of each of the first plurality of instructions, where each power weight is assigned independent of an instruction width of the corresponding instruction. The method also includes identifying a first threshold that is a largest of a set of thresholds, each of which is less than or equal to the first sum of power weights of the first plurality of instructions. The method further includes generating a request of a first power license whose value corresponds to the first threshold and submitting the request of the first power license to a power management unit (PMU) of the processor. The method may also include receiving, by the control logic, the power license responsive to the request. Optionally, the method includes upon receiving the power license, receiving updated parameter values that specify an updated frequency of operation of the core. Optionally, the method includes, responsive to a denial of the requested power license, throttling execution of the first plurality of instructions, optionally repeating the request for the first power license, and ceasing to throttle the execution of the first plurality of instructions when the request is granted.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one core including a first core, the first core comprising:
   an execution unit;
   counter logic to determine a first plurality of sums of power weights of a first plurality of instructions to be executed by the execution unit in a first time window, wherein each instruction is assigned a corresponding power weight that is determined independent of an instruction width of the corresponding instruction; and
   control logic to:
   categorize each sum of the first plurality of sums of power weights to increment a plurality of bin counters, each bin counter corresponding to one of a first plurality of thresholds;
   for each bin counter of the plurality of bin counters, multiply a count of the bin counter by the threshold corresponding to the bin counter to obtain a product associated with the bin counter;
   sum the products associated with the plurality of bin counters to determine a value of a first current protection license request for the first core based on the first plurality of bin counters; and
   request the first current protection license for the first core using the determined value.

2. The processor of claim 1, further comprising a power management unit (PMU) to provide the first current protection license to the control logic in response to the request.

3. The processor of claim 2, wherein the PMU is to receive a request of a corresponding current protection license from each of a plurality of cores and to grant the corresponding current protection licenses in response to the requests, wherein the corresponding current protection licenses are determined at least in part based on a power capacity of the PMU.

4. The processor of claim 3, wherein the PMU is to determine a respective action to be taken by each of the cores based on the licenses granted and based on the corresponding request of each of the cores.

5. The processor of claim 4, wherein the PMU is to determine a first action to be taken by the first core, the first action comprising throttling execution of the first plurality of instructions responsive to a first license granted that is smaller than the first request.

6. The processor of claim 4, wherein the PMU is to determine a first action to be taken by the first core, the first action including changing a first frequency of the first core.

7. The processor of claim 1, wherein a repeated string instruction has a power weight of zero.

8. A non-transitory machine-readable medium having stored thereon instructions, which if performed by a processor cause the processor to:
  receive, at control logic of a core of the processor, an indication of each instruction of a first plurality of instructions to be executed by the core during a first time window;
  determine a plurality of sums of power weights of the first plurality of instructions based on a respective power weight of each of the first plurality of instructions, wherein each instruction is assigned a corresponding power weight that is determined independent of an instruction width of the corresponding instruction;
  categorize each sum of the first plurality of sums of power weights to increment a plurality of bin counters, each bin counter corresponding to one of a first plurality of thresholds;
  for each bin counter of the plurality of bin counters, multiply a count of the bin counter by the threshold corresponding to the bin counter to obtain a product associated with the bin counter;
  sum the products associated with the plurality of bin counters to determine a value of a first current protection license request for the first core based on the first plurality of bin counters; and
  request the first current protection license from a power management unit (PMU) of the processor using the determined value.

9. The non-transitory machine-readable medium of claim 8, further comprising instructions to receive, by the control logic, the first current protection license responsive to the request and to execute the first plurality of instructions according to a current limit indicated by the first current protection license.

10. The non-transitory machine-readable medium of claim 8, further comprising instructions to, upon receipt of the first current protection license, receive updated parameter values that specify an updated frequency of operation of the core.

11. The non-transitory machine-readable medium of claim 8, wherein each of a plurality of special instructions, including a repeated string instruction, has a corresponding power weight of zero.

12. A system comprising:
  a system memory; and
  a processor coupled to the system memory and comprising a plurality of cores, wherein a first core of the plurality of cores comprises:
    an execution unit;
    counter logic to determine a first plurality of sums of power weights of a first plurality of instructions to be executed by the respective execution unit in a first time window based on a respective power weight of each of the first plurality of instructions, wherein each power weight is determined independent of an instruction width of the corresponding instruction; and
    control logic to:
    categorize each sum of the first plurality of sums of power weights to increment a plurality of bin counters, each bin counter corresponding to one of a first plurality of thresholds;
    for each bin counter of the plurality of bin counters, multiply a count of the bin counter by the threshold corresponding to the bin counter to obtain a product associated with the bin counter;
    sum the products associated with the plurality of bin counters to determine a value of a first current protection license request for the first core based on the first plurality of bin counters; and
    generate the current protection license request using the determined value.

13. The system of claim 12, further comprising a power management unit (PMU) to receive a respective license request from each of the cores and to issue a respective license to each core based on the received license requests.

14. The system of claim 13, wherein responsive to receipt from the respective control logic of the updated license request, the PMU is to:
  issue an updated current protection license based on the updated license request; and
  indicate to the control logic whether to adjust at least one of a guard band voltage parameter and a core frequency of the core, based on the updated license.

15. The system of claim 12, wherein the control logic is to send, to out-of-order logic of the first core, an indication to throttle instruction throughput to the execution unit until the requested current protection license is received.

* * * * *